US012639476B2

(12) United States Patent
Lee et al.

(10) Patent No.: US 12,639,476 B2
(45) Date of Patent: May 26, 2026

(54) METHOD AND SYSTEM FOR DYNAMICALLY UPDATING STACK CANARY

(71) Applicant: Samsung Electronics Co., Ltd., Suwon-si (KR)

(72) Inventors: Jaeyoung Lee, Suwon-si (KR); Sachin Pundkar, Bengaluru (IN); Somraj Mani, Bengaluru (IN); Surendra Singh, Bengaluru (IN); Tushar Vrind, Bengaluru (IN); Venkata Raju Indukuri, Bengaluru (IN); Danby Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 18/362,010

(22) Filed: Jul. 31, 2023

(65) Prior Publication Data

US 2024/0054250 A1 Feb. 15, 2024

(30) Foreign Application Priority Data

Aug. 12, 2022 (IN) .............................. 202221046110
Apr. 26, 2023 (IN) .............................. 202221046110

(51) Int. Cl.
*G06F 12/1009* (2016.01)
*G06F 12/14* (2006.01)
(Continued)

(52) U.S. Cl.
CPC .................................... *G06F 21/64* (2013.01)

(58) Field of Classification Search
CPC ...... G06F 21/64; G06F 21/57; G06F 12/1009; G06F 12/1416; G06F 21/52
(Continued)

(56) References Cited

U.S. PATENT DOCUMENTS 9,218,467 B2 12/2015 Matthews et al.
10,229,266 B2 3/2019 Gschwind
(Continued)

FOREIGN PATENT DOCUMENTS

JP 2006185233 A 7/2006

OTHER PUBLICATIONS

Hawkins, William H., et al., "Dynamic Canary Randomization for Improved Software Security", Proceedings of the 11th Annual Cyber and Information Security Research Conference, Apr. 5, 2016, 7 pages.

*Primary Examiner* — Andrew Suh
(74) *Attorney, Agent, or Firm* — Wolf, Greenfield & Sacks, P.C.

(57) ABSTRACT

A canary update method according to some embodiments is disclosed. The canary update method includes executing, by a processor configured to process tasks including the canary, computer program instructions to perform operations including extracting, by a processor, a first value from an array including N values, setting the canary to the first value, determining that the canary is updated based on a canary flag value of a first task, extracting, when determined that the canary is updated, a second value from the array, and updating the canary of the first task to the second value. The processor is configured to access a memory through a mapping circuit, and the mapping circuit includes mapping information between a physical memory region in the memory corresponding to the first task and a virtual memory region associated with the mapping circuit.

20 Claims, 17 Drawing Sheets

(51) Int. Cl.
    *G06F 21/52*     (2013.01)
    *G06F 21/57*     (2013.01)
    *G06F 21/64*     (2013.01)

(58) Field of Classification Search
    IPC .............. G06F 21/64, 21/57, 12/1009, 12/1416,
                                       21/52
    See application file for complete search history.

(56) References Cited

U.S. PATENT DOCUMENTS

| | | | |
|---|---|---|---|
| 10,268,601 B2 * | 4/2019 | Okhravi | ................... G06F 21/52 |
| 10,523,418 B2 * | 12/2019 | Hamburg | .............. H04L 9/3247 |
| 2016/0028767 A1 | 1/2016 | Ripoll et al. | |
| 2018/0060568 A1 * | 3/2018 | Galenson | .............. G06F 21/554 |
| 2018/0143781 A1 * | 5/2018 | Greathouse | ............. G06F 9/451 |
| 2020/0035284 A1 * | 1/2020 | Mahatme | ............ G11C 11/1673 |

\* cited by examiner

|          | VA    | PA    |
|----------|-------|-------|
| task A   | VA_A  | PA_A  |
| task B   | VA_B  | PA_B  |
| task C   | VA_C  | PA_C  |
| ...      | ...   | ...   |
| task Z   | VA_Z  | PA_Z  |

1

METHOD AND SYSTEM FOR DYNAMICALLY UPDATING STACK CANARY

CROSS-REFERENCE TO RELATED APPLICATIONS

The present application claims priority to and the benefit under 35 U.S.C. § 119(a)-(d) of Indian Patent Application number 202221046110, filed Apr. 26, 2023, and Indian Patent Application number 202221046110, filed Aug. 12, 2022, in the Indian Intellectual Property Office, each of which is hereby incorporated herein by reference in its entirety.

BACKGROUND

The inventive concept relates to a stack canary, and more particularly, to a method and system for dynamically updating a stack canary of a task to be processed by a processor.

When buffer overflow occurs in a task performed by a processor, a program or a system may be damaged. A stack canary may be used to detect such a buffer overflow attack.

A canary value used in the stack canary may be set when a system boots, and after the system boots, the canary value may not be changed while the system is operating. Therefore, the canary value may be exposed to hackers.

SUMMARY

The inventive concept provides a stack canary update method and system capable of allowing the system to have relatively high security.

According to some embodiments of the inventive concept, there is provided a method of updating a canary included in a task to be processed by a processor, the method including executing, by a processor configured to process tasks including the canary, computer program instructions to perform operations including extracting a first value from an array including N values and setting the canary to the first value, determining that the canary is updated based on a canary flag value of a first task, and extracting, after determining that the canary is updated, a second value from the array and updating the canary of the first task to the second value. The processor is configured to access a memory through a mapping circuit, and the mapping circuit includes mapping information between a physical memory region in the memory corresponding to the first task and a virtual memory region associated with the mapping circuit.

According to some embodiments of the inventive concept, there is provided a system including a first processor configured to process tasks, a memory including an array including a plurality of values and regions allocated to the tasks to be processed by the first processor, and a mapping circuit configured to map a physical memory region among the regions allocated to the tasks to a virtual memory region. The first processor is further configured to perform operations including extracting a first value from the array, allocating the first value to a canary of a first task, determining that the canary of the first task is updated based on a change in a canary flag value of the first task, and after determining that the canary is updated, extract a second value from the array and update the canary of the first task to the second value.

According to some embodiments of the inventive concept, there is provided a non-transitory computer-readable storage medium storing instructions that, when executed by a processor, causes the processor perform operations including extracting a first value from an array including N values and setting the canary to the first value, determining that the canary is updated based on a canary flag value of the task, and extracting, after determining that the canary is updated, a second value from the array and updating the canary of the first task to the second value. The processor is configured to access a memory through a mapping circuit, and the mapping circuit includes mapping information between a physical memory region of the memory corresponding to the task and a virtual memory region associated with the mapping circuit.

BRIEF DESCRIPTION OF THE DRAWINGS

Embodiments of the inventive concept will be more clearly understood from the following detailed description taken in conjunction with the accompanying drawings in which:

FIGS. 6A and 6B illustrate a canary update according to some embodiments;

FIG. 10 illustrates a mapping table according to some embodiments;

DETAILED DESCRIPTION

Hereinafter, embodiments are described in detail with reference to the accompanying drawings.

Figure 1:
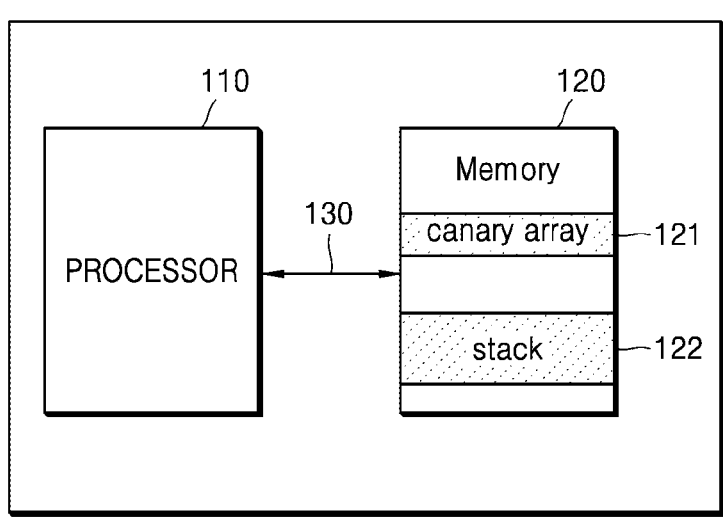
FIG. 1 is a block diagram illustrating a system according to some embodiments.

FIG. 1 is a block diagram illustrating a system 10 according to some embodiments.

The system 10 may be referred to as an arbitrary system including a processor 110 and a memory 120. For example, the system 10 may be a computing system, such as a personal computer, a mobile phone, or a server, a module in which the processor 110 and the memory 120 are mounted on a substrate as independent packages, or a system-on-chip (SoC) in which the processor 110 and the memory 120 are embedded in one chip. As shown in FIG. 1, the system 10 may include the processor 110 and the memory 120.

The processor 110 may communicate with the memory 120 and execute instructions. In some embodiments, the processor 110 may execute a task stored in the memory 120. The task may include a series of instructions and indicate a unit of jobs scheduled for the system 10 to normally operate. The processor 110 may be hardware capable of independently executing instructions and referred to as an application processor (AP), a communication processor (CP), a baseband processor (BP), a baseband modem, a central processing unit (CPU), a processor core, a core, or the like.

The processor 110 may communicate with the memory 120 via a bus 130. The bus 130 may operate based on one of various bus protocols. The various bus protocols may include at least one of an advanced microcontroller bus architecture (AMBA) protocol, a universal serial bus (USB) protocol, a multimedia card (MMC) protocol, a peripheral component Interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a mobile industry processor interface (MIPI) protocol, and/or a universal flash storage (UFS) protocol.

In some embodiments, the processor 110 may include a plurality of processing cores. Therefore, the processor 110 may be referred to as a multi-core processor, or the system 10 including the processor 110 or the memory 120 may be referred to as a multi-core processor.

The memory 120 may be accessed by the processor 110 and store a software element executable by the processor 110 or a core included in the processor 110. For example, the memory 120 may store a canary update module configured to perform a method of updating a stack canary, according to some embodiments. As shown in FIG. 1, the memory 120 may include a canary array 121 and a stack 122 needed for a task to be performed.

The software element may include, as a non-limiting example, a software component, a program, an application, a computer program, an application program, a system program, a software development program, a machine program, an operating system (OS), software, middleware, firmware, a software module, a routine, a subroutine, a function, a method, a procedure, a software interface, an application program interface (API), a command set, computing code, computer code, a code segment, a computer code segment, a word, a value, a symbol, or a combination thereof.

The memory 120 may be hardware capable of storing information and accessible by the processor 110. For example, the memory 120 may include read-only memory (ROM), random access memory (RAM), dynamic random access memory (DRAM), double-data-rate dynamic random access memory (DDR-DRAM), synchronous dynamic random access memory (SDRAM), static random access memory (SRAM), magnetoresistive random access memory (MRAM), programmable read-only memory (PROM), erasable programmable read-only memory (EPROM), electrically erasable programmable read-only memory (EEPROM), flash memory, a polymer memory, a phase change memory, a ferroelectric memory, a silicon-oxide-nitride-oxide-silicon (SONOS) memory, a magnetic card/disk, an optical card/disc, or a combination thereof.

The stack 122 may be a region in which information needed for the processor 110 to process a task is stored. For example, the stack 122 may be a region of the memory 120, in which local variables and a return address are stored. A portion of the stack 122 may be referred to as a buffer or a stack buffer. The local variables may be used while performing a task, and the return address may be an address for returning to a parent task after the task ends. The stack 122 may include a return address region in which the return address is stored, and the return address region may be allocated to the bottom of the stack 122 or allocated to be adjacent to the bottom of the stack 122.

In some embodiments, the system 10 may allocate a value input from the outside to the stack 122 of the task. If the value input from the outside exceeds a capacity permitted to the stack 122 of the task, buffer overflow may occur. In this case, the return address region included in the stack 122 of the task may be modified due to the buffer overflow. For example, a hacker may intentionally push, to a buffer of the task, a dummy value, exceeding a capacity permitted to the buffer of the task, and a return address of malicious code. The return address region modified due to the buffer overflow may be a region in which an address value of the malicious code intentionally pushed by the hacker returns. Therefore, the task may perform a wrong operation due to the malicious code, and accordingly, a program and/or the system 10 may be damaged.

To prevent the program from being damaged due to buffer overflow, the stack 122 may include a canary value. The canary value may be referred to as a canary or a stack check guard value. A detailed description of the canary value is made below with reference to FIGS. 2A, 2B, and 3. According to various embodiments described herein, setting and/or updating the canary value is used to improve the reliability of the system and the memory technology, and to improve operation of a device that includes a processor and memory by improving the security and protecting against malicious attacks.

The memory 120 may store the canary array 121. The canary array 121 may include a plurality of values, which may be set as a canary value of a task. According to some embodiments, the processor 110 may update canary values of tasks based on elements included in the canary array 121. A memory address allocated to the canary array 121 may be virtualized and managed by a memory management unit (MMU). Therefore, a situation that the canary array 121 is exposed to the outside or a situation that a value in the canary array 121 is changed due to an unintentional operation or an external attack may be prevented. A detailed description of the MMU is made below with reference to FIG. 9, and a detailed description of the canary array 121 is made below with reference to FIGS. 7 to 10.

Although not shown in FIG. 1, the memory 120 may store an OS and a canary update module. The OS and the canary update module may be executed by the processor 110. In some embodiments, the canary update module may be included in the OS. For example, the OS may be executed by the system 10, and applications may be executed on the OS. The canary update module may manage canary flag values of tasks generated in a higher layer (e.g., a framework or an application) and/or tasks generated in a kernel including the canary update module (e.g., tasks generated by a device driver), and a canary update order of the tasks. A particular operation of the canary update module is described below with reference to FIGS. 4 and 8.

A system operating method and the canary update module, according to some embodiments, may be stored in a non-transitory computer-readable storage medium. The term "computer-readable storage medium" may include ROM, RAM, a hard disk drive, a compact disc (CD), a digital video disc (DVD), or another type of memory, such as a type of medium accessible by a computer. The term "non-transitory computer-readable medium" may exclude wired, wireless, optical, or other communication links configured to transmit transitory electrical signals or other signals and may include a medium in which data may be permanently stored and a medium in which data may be stored and overwritten thereafter, such as a re-recordable optical disc or an erasable memory device.

Hereinafter, canary update may indicate updating a canary value of a task to a new value.

Figure 2A:
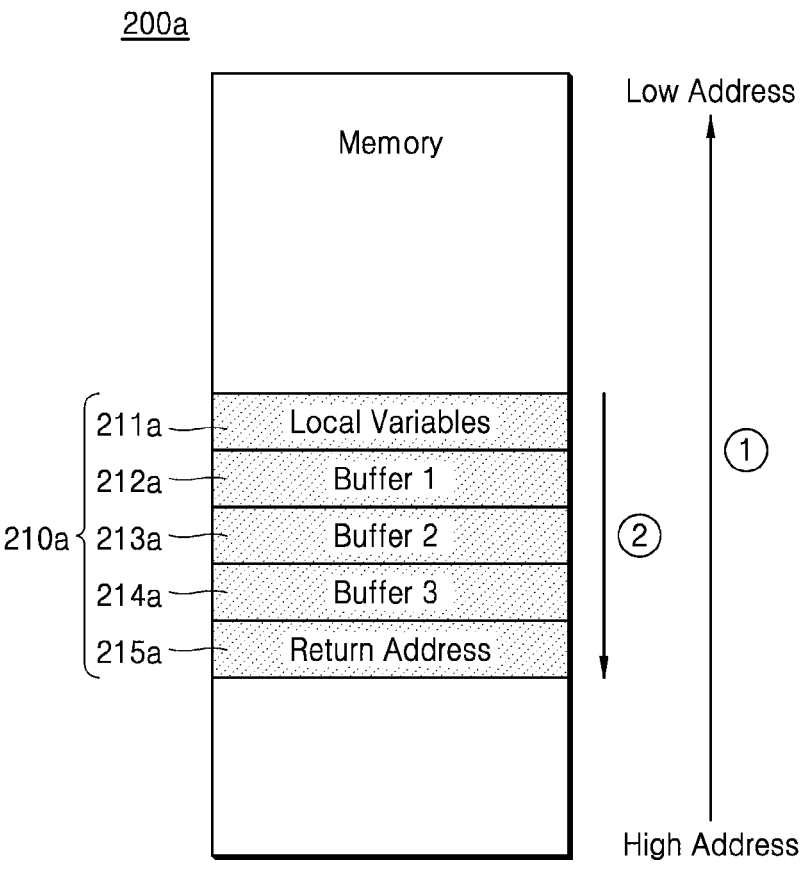
FIGS. 2A and 2B illustrate buffer overflow according to a comparative example.
Figure 2B:
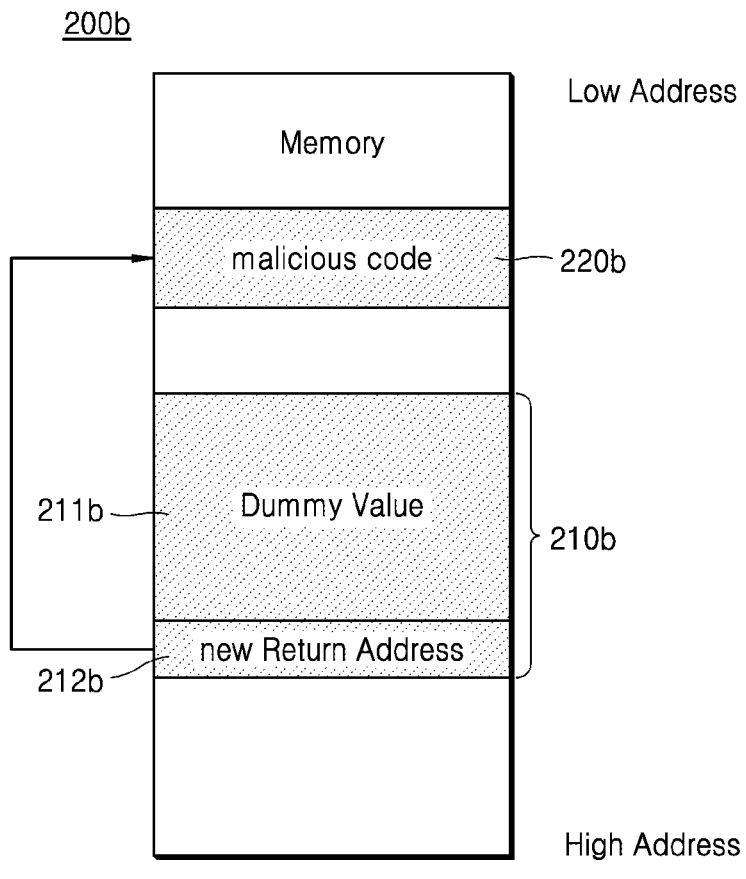

FIGS. 2A and 2B illustrate buffer overflow according to a comparative example. Particularly, FIGS. 2A and 2B illustrate cases where task stacks 210a and 210b have no canary. A description made with reference to FIG. 1 may not be repeated herein.

A memory 200a of FIG. 2A and a memory 200b of FIG. 2B indicate physical memory regions including the task stacks 210a and 210b, respectively. Referring to FIG. 2A, the memory 200a may include the task stack 210a. The task stack 210a may include various kinds of buffer regions needed to perform a task. For example, the task stack 210a may include a local variable region 211a, a first buffer region 212a, a second buffer region 213a, a third buffer region 214a, and a return address region 215a. The task stack 210a may be allocated in a direction ① from a high address to a low address of the memory 200a. When an external input value is provided to a task to update a value recorded in the local variable region 211a and the first to third buffer regions 212a, 213a, and 214a to another value, the task stack 210a may be updated in a direction ② from the low address to the high address. Although only the task stack 210a for one task is shown in FIG. 2A, the memory 200a may include a plurality of stacks to process a plurality of tasks, respectively.

FIG. 2B illustrates an example in which the task stack 210a of FIG. 2A is modified due to buffer overflow. For example, a hacker may push a capacity, which is greater than a capacity permitted to the task stack 210a of FIG. 2A, to the local variable region 211a and the first to third buffer regions 212a, 213a, and 214a of the task. Therefore, the task stack 210b of FIG. 2B may include a dummy value 211b and a new return address region 212b. Accordingly, after the task ends, a return address stored in the return address region 215a of FIG. 2A may be lost. Therefore, a processor may execute code in a malicious code region 220b pushed by the hacker instead of returning to a parent task. The hacker may intentionally cause this buffer overflow in a program, thereby resulting in damage to the program and/or a system.

Figure 3:
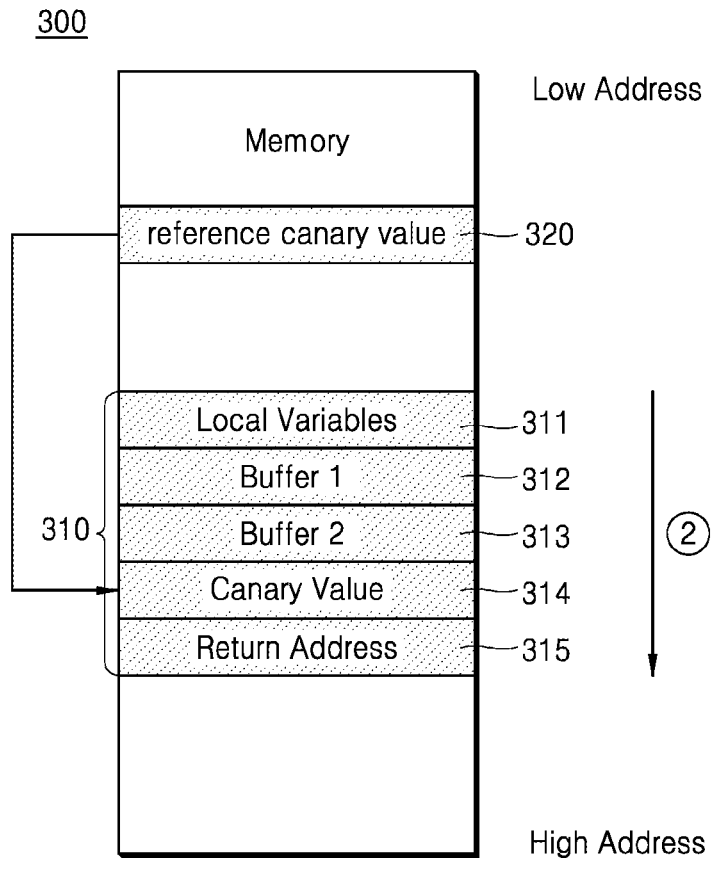
FIG. 3 illustrates a memory region according to a comparative example.

FIG. 3 illustrates a memory region according to a comparative example. Particularly, FIG. 3 illustrates a case where a task stack 310 has a canary value 314. A description made with reference to FIGS. 1, 2A, and 2B may not be repeated herein.

A memory 300 of FIG. 3 indicates a physical memory region including the task stack 310. The memory 300 of FIG. 3 may store a reference canary value 320 and include the task stack 310. The reference canary value 320 may have a certain fixed value or a certain value randomly generated in every booting. A processor may set the reference canary value 320 as the canary value 314 of a task.

The task stack 310 may include a local variables region 311, a first buffer region 312, a second buffer region 313, the canary value 314, and a return address region 315. As shown in FIG. 3, the canary value 314 may be located at a lower memory address than a memory address of the return address region 315. As described below, the canary value 314 may be a portion of the task stack 310 from which a change in the return address region 315 is detected.

As described above, when an external input value is provided to the task to update a value recorded in the local variable region 311 and the first and second buffer regions 312 and 313 to another value, the task stack 310 may be updated in the direction ② from the low address to the high address. Therefore, when the return address region 315 of the stack is modified due to buffer overflow, the canary value 314 is also modified. The processor may check whether there has been a buffer overflow attack, by checking the canary value 314 before returning to a region indicated by a return address. In other words, the processor may compare the canary value 314 to the reference canary value 320 before executing another task or code corresponding to an address stored in the return address region 315. The processor may determine whether the canary value 314 is true, through this comparison. If the canary value 314 is different from the reference canary value 320, the processor may determine that buffer overflow has occurred in a system. If it is determined that buffer overflow has occurred in the system, the processor may protect the system by forcibly terminating the system, the task, or the program, or by aborting execution of malicious code. Therefore, the security of the system may be reinforced by inserting the canary value 314 into the task stack 310.

A value set as the canary value 314 may be defined when the system boots. The canary value 314 may be set as a value corresponding to the reference canary value 320. If the canary value 314 defined when the system boots continuously has the same value unless the system re-boots, the reference canary value 320 or the canary value 314 may be exposed to a hacker. Therefore, the security of the system may be vulnerable.

Figure 4:
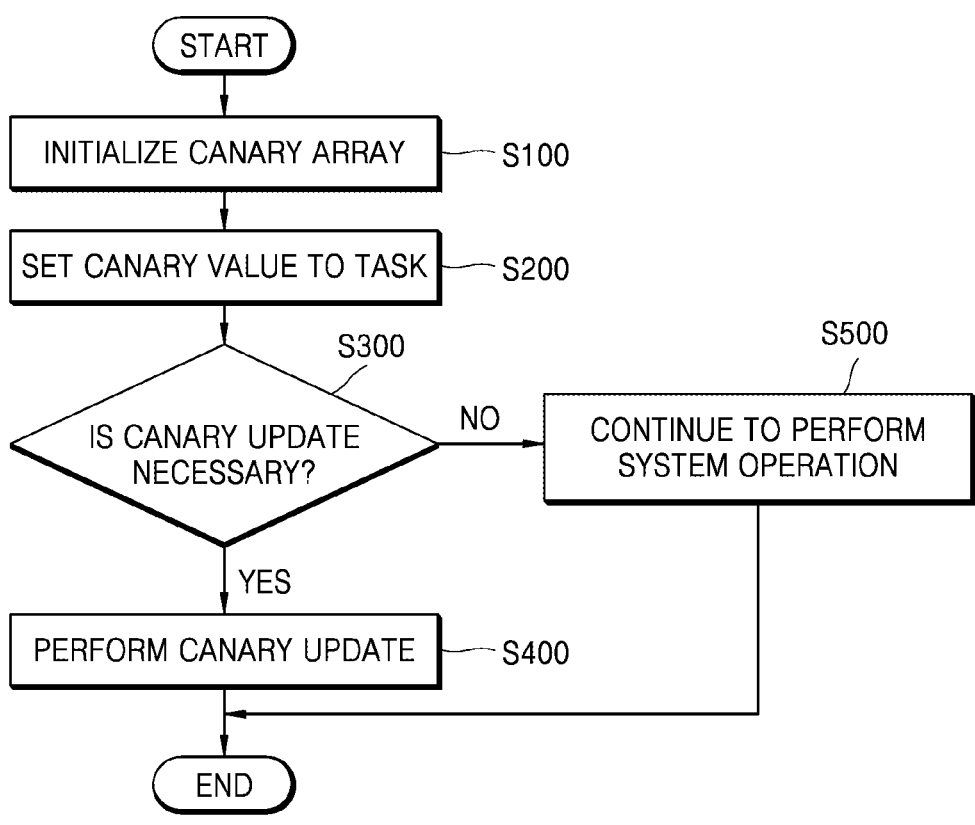
FIG. 4 is a flowchart illustrating a canary update method according to some embodiments.

FIG. 4 is a flowchart illustrating a canary update method according to some embodiments. Particularly, the flowchart of FIG. 4 illustrates a method, performed by the processor 110 in the system 10 of FIG. 1, of updating a canary value of a task. FIG. 4 is described with reference to FIG. 1. A description made with reference to FIG. 1 may not be repeated herein. The method described in the flowchart of FIG. 4 improves the operation of the memory in the system by solving technical problems related to malicious attacks that may overwrite portions of memory that includes local variables, processor instructions, tasks, and stacks. The system may be protected from malicious attacks by using the canary value based on the operations described by the method in the flowchart.

In operation S100, the processor 110 may initialize the canary array 121 by transmitting, to the memory 120, a plurality of values to be allocated to elements in the canary array 121. The initializing the canary array 121 may include ensuring a region for the canary array 121 in the memory 120, based on the plurality of values transmitted from the processor 110. In some embodiments, the initialization of the canary array 121 may be performed when the system 10 boots.

The canary array 121 may include a plurality of elements. The plurality of elements in the canary array 121 may be based on the plurality of values received from the processor 110. The plurality of elements may be different from each other.

Generating the plurality of values needed to initialize the canary array 121 is described below with reference to FIGS. 11 and 12.

In operation S200, the processor 110 may select one element from the canary array 121. The selected one element may be set as a canary value of the task. The processor 110 may set the canary value of the task and then perform an operation needed to process the task. In some embodiments, an initial canary value allocated to the task may be a first element in the canary array 121. In some embodiments, the initial canary value allocated to the task may be an element randomly selected from the canary array 121. A detailed description of operation S200 is made with reference to FIG. 13.

Operation S200 may be performed when the processor 110 ensures, in the memory 120, the stack 122 has a space needed to process a certain task, before processing the certain task. In this case, a canary flag value of the certain task may be a first flag value.

In some embodiments, operation S200 may be performed by omitting operation S100. That is, even at a time point at which a considerable time has elapsed after the system 10 boots, operations S200 to S500 may be performed when the processor 110 starts to execute a task. The time point at which a considerable time has elapsed after the system 10 boots may be, for example, a time point at which the processor 110 starts to execute a task again after performing a canary update of a task.

In operation S300, the processor 110 may determine whether it is necessary to update the canary value of the task. Particularly, the processor 110 may determine that a canary update of a task having a second flag value is necessary. A detailed description of a method of determining whether a canary update is performed, according to a change in a canary flag value of a task, is made below with reference to FIG. 8.

In operation S400, the processor 110 may perform the canary update of the task based on information stored in a canary update queue.

In some embodiments, the canary update may be performed when the processor 110 does not perform an operation on tasks and is in an idle state. In some embodiments, the canary update may be performed immediately after information about a canary update to be performed is stored in the canary update queue. The canary update queue is described below with reference to FIG. 8. A detailed description of operation S400 is made with reference to FIG. 14.

In operation S500, if the processor 110 determines in operation S300 that it is not necessary to update the canary value of the task, the processor 110 may continue to perform an operation of processing a task.

Figure 5:
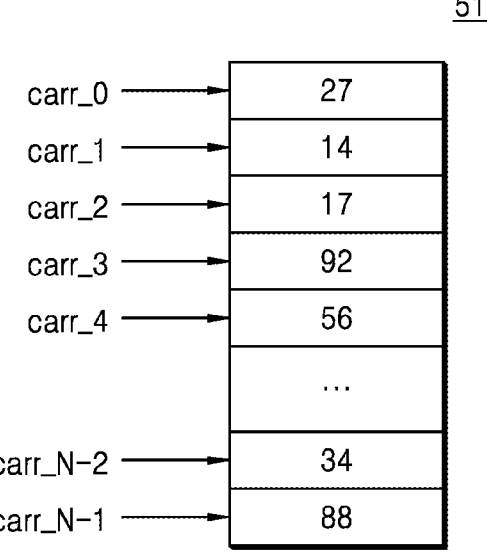
FIG. 5 illustrates a canary array according to some embodiments.

FIG. 5 illustrates a canary array 510 according to some embodiments. Particularly, the canary array 510 may be an example of the canary array 121 of FIG. 1. FIG. 5 is described with reference to FIGS. 1 and 4. A description made with reference to FIGS. 1 and 4 may not be repeated herein.

The canary array 510 may have a plurality of elements. FIG. 5 shows that the canary array 510 has N elements, wherein N may be an integer greater than or equal to 1. That is, the canary array 510 of FIG. 5 includes a first element carr_0 to an (N−1)th element carr_N−1. The size N of the canary array 510 may be determined in advance. In some embodiments, the size N of the canary array 510 may be selected from values of 1 to 100 by considering the capacity of the memory 120.

Values respectively allocated to the first element carr_0 to the (N−1)th element carr_N−1 in the canary array 510 are illustrative and may be changed to different values. Although FIG. 5 shows that the first element carr_0 to the (N−1)th element carr_N−1 in the canary array 510 have integer-type values, this is only illustrative. In some embodiments, each of the first element carr_0 to the (N−1)th element carr_N−1 in the canary array 510 may have a floating point-type value, a character-type value, or a string-type value.

The processor 110 may allocate one of the first element carr_0 to the (N−1)th element carr_N−1 included in the canary array 510 to a canary value when a task is initially executed. The processor 110 may update canary values allocated to executed tasks. That is, the processor 110 may newly select any one of the first element carr_0 to the (N−1)th element carr_N−1 included in the canary array 510 and allocate the selected element to a new canary value of a task. A detailed description of the canary update is made below with reference to FIGS. 6A and 6B.

The canary array 510 may be initialized when the system 10 boots. The first element carr_0 to the (N−1)th element carr_N−1 in the canary array 510 may be based on a plurality of values provided from the processor 110, respectively. The plurality of values may be fixed values included in the processor 110, fixed values included in an external storage device of the processor 110, or values randomly generated by the processor 110 or a different processor (e.g., a second processor 1130 of FIG. 11) when the system 10 boots.

In some embodiments, the plurality of values transmitted from the processor 110 to the memory 120 may be values stored in a storage device. Therefore, even when the processor 110 performs an array initialization job or re-boots the system 10, values in the canary array 121 may be maintained.

The storage device storing the plurality of values may be provided inside or outside the processor 110. For example, the storage device storing the plurality of values may include at least one of ROM, SRAM, MRAM, PROM, EPROM, EEPROM, flash memory, and the like but is not limited thereto.

In some embodiments, the plurality of values transmitted from the processor 110 to the memory 120 may be values randomly generated when the processor 110 boots the system 10. Therefore, when the processor 110 performs an array initialization job or re-boots the system 10, values in the canary array 121 may be changed.

In some embodiments, the plurality of values transmitted from the processor 110 to the memory 120 may be values randomly generated by a different processor (e.g., the second processor 1130 of FIG. 11) when the system 10 boots. Therefore, when the processor 110 performs an array initialization job or re-boots the system 10, values in the canary array 121 may be changed. A description of the plurality of values generated by a different processor and a description of a particular operation by the different processor are made below with reference to FIGS. 11 and 12.

The canary array 510 may be updated even during running of the system 10, i.e., dynamically. When the canary array 510 is updated, a value allocated to each element in the canary array 510 may be updated to a new value. Because the canary array 510 may be updated to make a canary value set to a task vary, the security of the system 10 may be further reinforced.

In some embodiments, the canary update module may count the number of canary updates performed for tasks processed by the processor 110. When the number of performed canary updates is a reference value or greater, the processor 110 may update the canary array 510. The reference value may be a value defined in advance when the system 10 is manufactured.

Figure 6A:
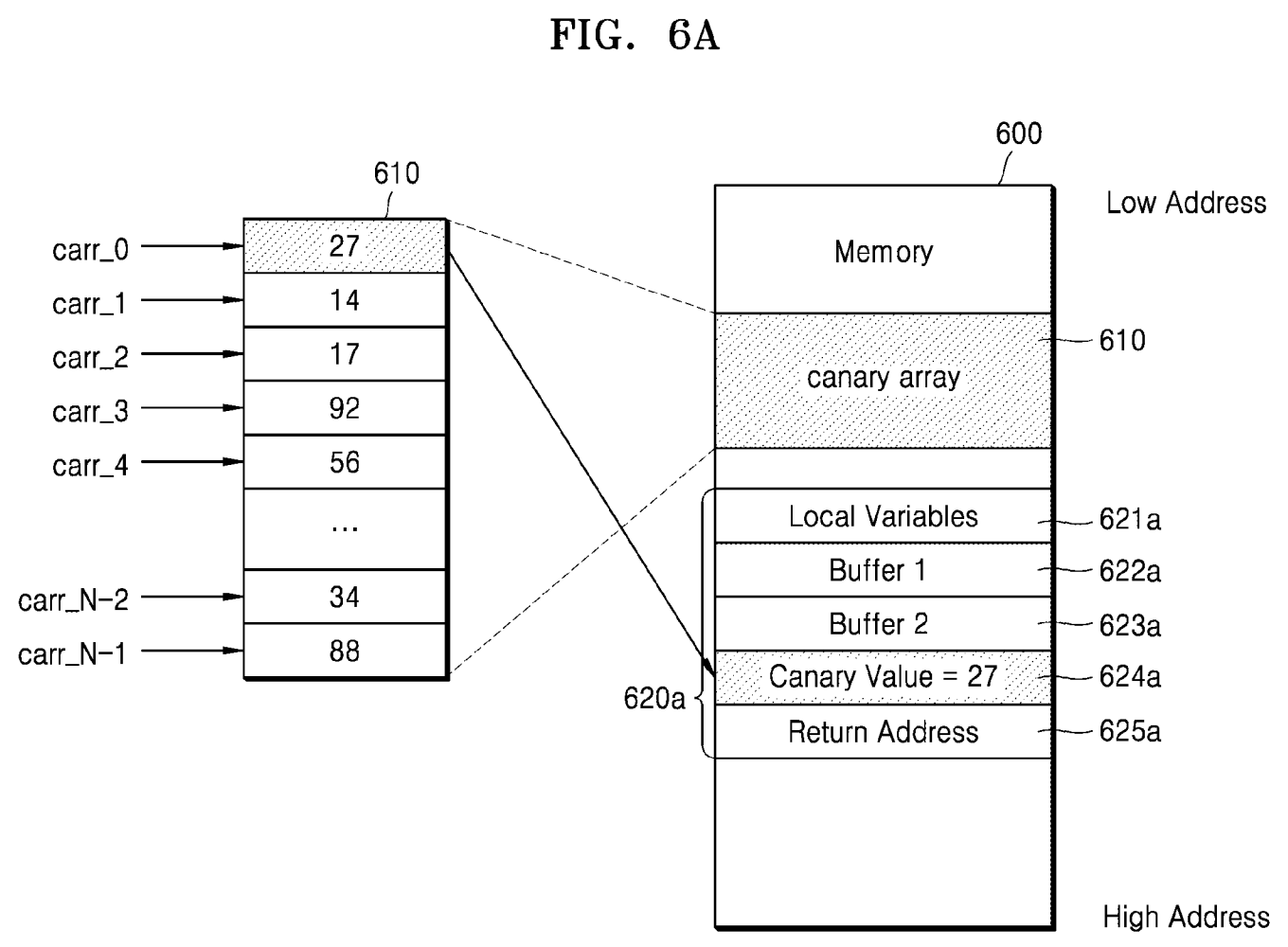
Figure 6B:
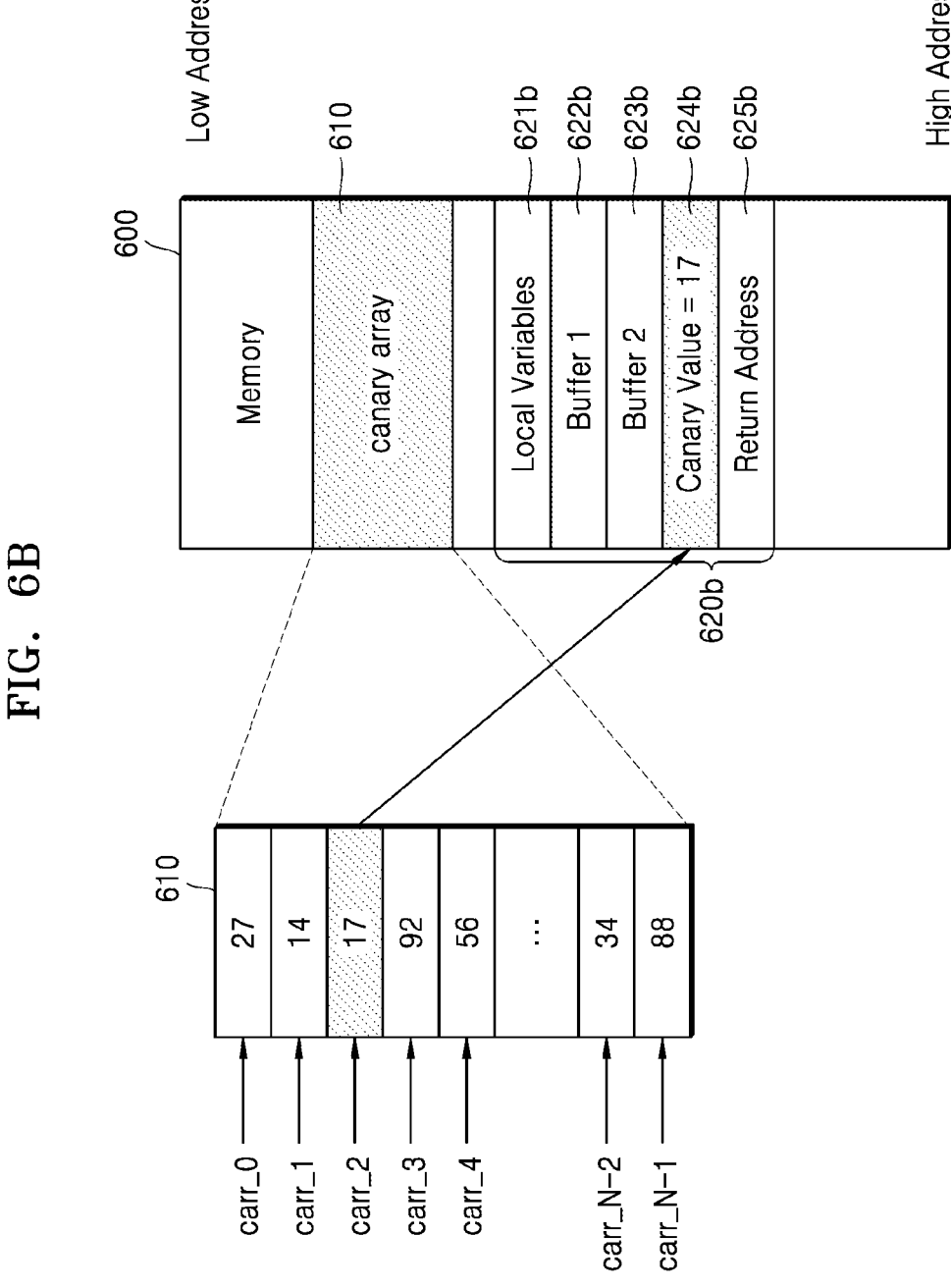

FIGS. 6A and 6B illustrate a canary update according to some embodiments. Particularly, FIGS. 6A and 6B illustrate a process, performed by the processor 110, of updating a canary value 624a or 624b to a value selected from a canary array 610. A memory 600 may correspond to the memory 120 of FIG. 1. The canary array 610 may correspond to the canary array 121 of FIG. 1 of the canary array 510 of FIG. 5. Each of task stacks 620a and 620b of FIGS. 6A and 6B may correspond to the stack 122 of FIG. 1. FIGS. 6A and 6B are described with reference to FIG. 1. A description made with reference to FIG. 1 may not be repeated herein.

FIG. 6A may illustrate the memory 600 at a time point at which the processor 110 starts to execute an operation of a task. The memory 600 may include the canary array 610 and the task stack 620a. The task stack 620a may include a local variable region 621a, a first buffer region 622a, a second buffer region 623a, the canary value 624a, and a return address region 625a.

In some embodiments, the processor 110 may ensure the task stack 620a in the memory 600 before starting to execute a task. In this case, the processor 110 may set the canary value 624a of the task as 27 that is the first element carr_0 in the canary array 610. The processor 110 selecting the first element carr_0 in the canary array 610 as the canary value 624a of the task is only illustrative, and another element may be selected.

FIG. 6B may illustrate the memory 600 at a time point at which the processor 110 updates a canary of a task. That is, the canary value 624b of the task may be updated from the canary value 624a shown in FIG. 6A. FIG. 6B may indicate a state of the memory 120 of the system 10 when operation S400 of FIG. 4 is performed.

The memory 600 may include the canary array 610 and the task stack 620b. The task stack 620b may include a local variable region 621b, a first buffer region 622b, a second buffer region 623b, the canary value 624b, and a return address region 625b.

The processor 110 may select one element in the canary array 610. The selected value may be used to update the canary of the task to a new canary. The value selected from the canary array 610 to update the canary of the task may be different from the canary value 624a that is an existing value. In some embodiments, the processor 110 may select the third element carr_2 from the canary array 610. The task before an update may have the canary value 624a of 27 as shown in FIG. 6A. The processor 110 may update the canary value 624a to the canary value 624b that is a new canary value of the task, the canary value 624b being 17 that is a value of the third element carr_2. The processor 110 selecting the third element carr_2 as a value for a canary update is only illustrative, and another element in the canary array 610 may be selected.

In some embodiments, the local variable region 621b, the first buffer region 622b, and the second buffer region 623b of FIG. 6B may have the same values as or different values from the local variable region 621a, the first buffer region 622a, and the second buffer region 623a of FIG. 6A. The return address region 625b of FIG. 6B may have the same value as the return address region 625a of FIG. 6A.

Figure 7:
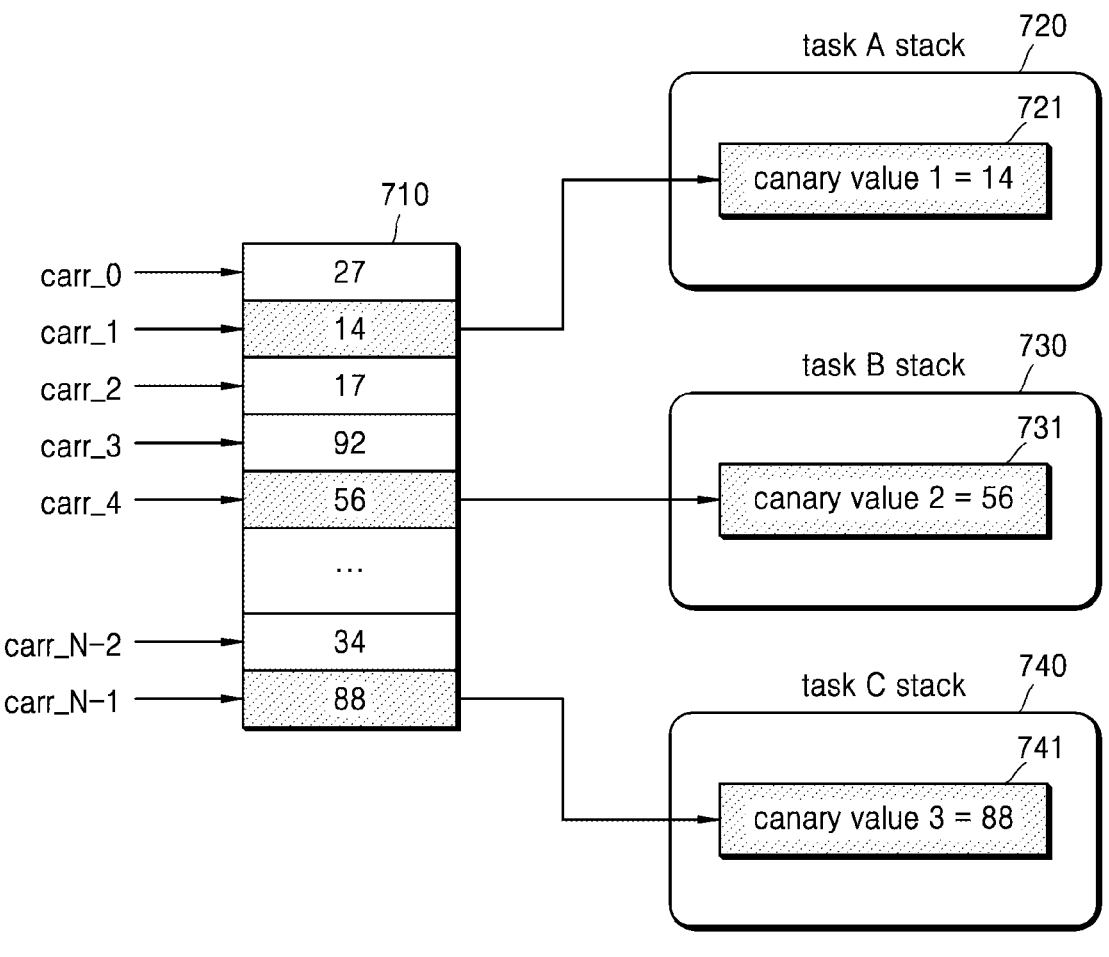
FIG. 7 illustrates canary values of tasks, according to some embodiments.

FIG. 7 illustrates first, second, and third canary values 721, 731, and 741 of tasks, according to some embodiments. Particularly, FIG. 7 illustrates, for comparison, the first, second, and third canary values 721, 731, and 741, which the tasks to be processed by the processor 110 respectively have. FIG. 7 is described with reference to FIGS. 1 and 5. A description made with reference to FIGS. 1 and 5 may not be repeated herein.

A canary array 710 shown in FIG. 7 may correspond to the canary array 121 of FIG. 1, the canary array 510 of FIG. 5, or the canary array 610 of FIGS. 6A and 6B. The canary array 710 may be included in the memory 120.

The processor 110 may parallel-process two or more tasks. Although FIG. 7 shows three tasks, the processor 110 may process a greater number of tasks.

The memory 120 may include a task A stack 720. The task A stack 720 may include the first canary value 721. In some embodiments, a value set as the first canary value 721 may be 14 that is the second element carr_1 in the canary array 710.

The memory 120 may include a task B stack 730. The task B stack 730 may include the second canary value 731. In some embodiments, a value set as the second canary value 731 may be 56 that is the fifth element carr_4 in the canary array 710.

The memory 120 may include a task C stack 740. The task C stack 740 may include the third canary value 741. In some embodiments, a value set as the third canary value 741 may be 88 that is the Nth element carr_N−1 in the canary array 710.

As shown in FIG. 7, the first canary value 721, the second canary value 732, and the third canary value 741 may have different values. However, this is illustrative, and in a process, performed by the processor 110, of selecting a value in the canary array 710, the first canary value 721, the second canary value 732, and/or the third canary value 741 may have the same value.

Figure 8:
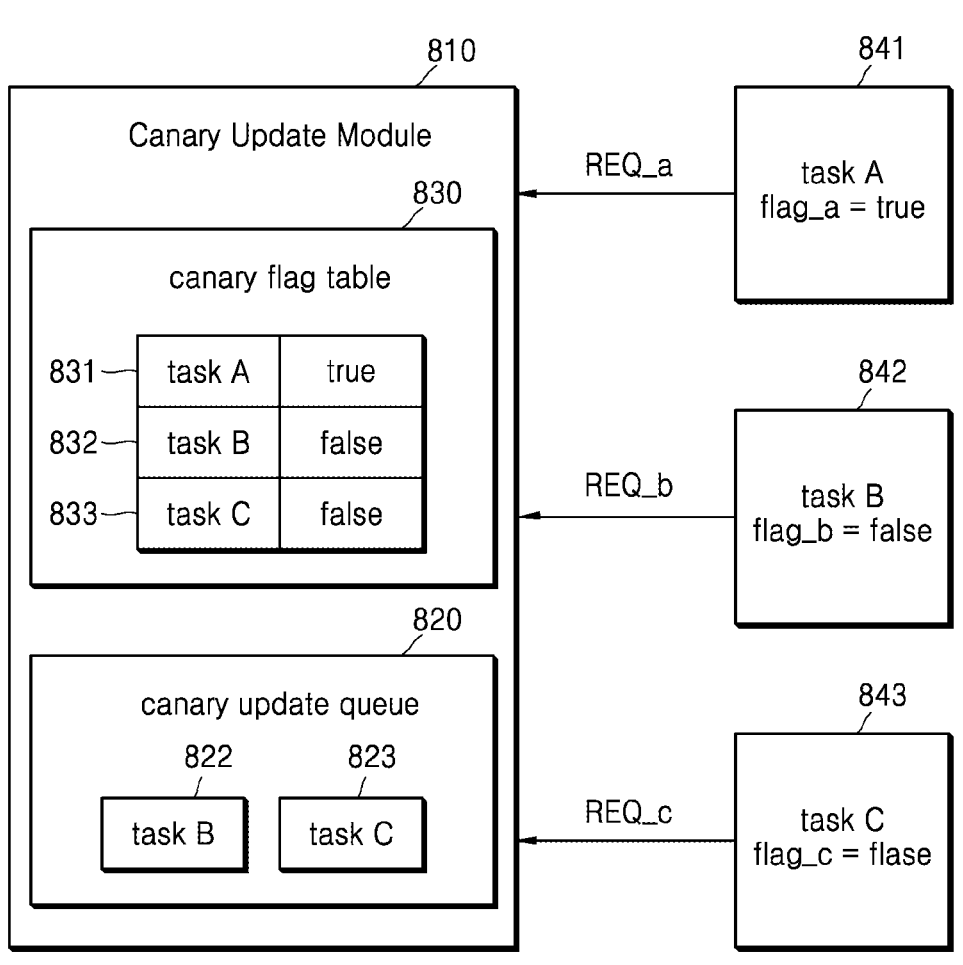
FIG. 8 illustrates a method of updating canary flag values of tasks, according to some embodiments.

FIG. 8 illustrates a method of updating canary flag values of tasks, according to some embodiments. Particularly, FIG. 8 illustrates a method, performed by the processor 110, of updating canary flag values by executing a canary update module including information about canary flag values of tasks and information about whether a canary update of the tasks is to be performed, and determining a task of which a canary update is necessary. The memory 120 may include a canary update module 810. The canary update module 810 may be executed by the processor 110, and the processor 110 may update a canary update value by executing the canary update module 810. FIG. 8 is described with reference to FIG. 1. A description made with reference to FIG. 1 may not be repeated herein.

The canary update module 810 may include a canary update queue 820 and a canary flag table 830. The canary update module 810 may receive flag update signals REQ_a, REQ_b, and REQ_c from tasks, respectively. The flag update signals REQ_a, REQ_b, and REQ_c may be transmitted when the processor 110 starts to process the tasks, respectively, or ends processing of the tasks, respectively.

The canary flag table 830 may include information about a canary flag value of each task to be processed by the processor 110. In some embodiments, a canary flag value may be a true or a false value. The true value may be referred to as the first flag value, and the false value may be referred to as the second flag value.

In some embodiments, when the processor 110 starts to process task A 841, the task A 841 may transmit the flag update signal REQ_a to the canary update module 810 so that a canary flag value of the task A 841 is the first flag value. Therefore, the canary flag table 830 may store information 831 indicating that the canary flag value of the task A 841 is the first flag value.

In some embodiments, when the processor 110 ends processing of task B 842, the task B 842 may transmit the flag update signal REQ_b to the canary update module 810 so that a canary flag value of the task B 842 is the second flag value. Therefore, the canary flag table 830 may store information 832 indicating that the canary flag value of the task B 842 is the second flag value.

In some embodiments, when the processor 110 ends processing of task C 843, the task C 843 may transmit the flag update signal REQ_c to the canary update module 810 so that a canary flag value of the task C 843 is the second flag value. Therefore, the canary flag table 830 may store information 833 indicating that the canary flag value of the task C 843 is the second flag value.

The canary update queue 820 may include the pieces of information 822 and 823 (pieces of canary update-to-be-performed information 822 and 823) about the tasks of which a canary update is to be performed. Particularly, the canary update module 810 may store the pieces of canary update-to-be-performed information 822 and 823 in the canary update queue 820 based on information included in the canary flag table 830. For example, if a canary flag value of a certain task is the second flag value, a canary update of the certain task may be necessary. Therefore, the canary update module 810 may store canary update-to-be-performed information in the canary update queue 820 so that the canary update of the certain task is performed.

In some embodiments, the information 831 indicating that the canary flag value of the task A 841 is the first flag value may be included in the canary flag table 830. Therefore, the canary update module 810 may determine that a canary update is not necessary for the task A 841.

In some embodiments, the information 832 indicating that the canary flag value of the task B 842 is the second flag value may be included in the canary flag table 830. Therefore, the canary update module 810 may determine that a canary update is necessary for the task B 842. Therefore, the canary update-to-be-performed information 822 about the task B 842 may be stored in the canary update queue 820.

In some embodiments, the information 833 indicating that the canary flag value of the task C 843 is the second flag value may be included in the canary flag table 830. Therefore, the canary update module 810 may determine that a canary update is necessary for the task C 843. Therefore, the canary update-to-be-performed information 823 about the task C 843 may be stored in the canary update queue 820.

The processor 110 may perform a canary update of a task by executing the canary update module 810.

In some embodiments, if the number of pieces of canary update-to-be-performed information stored in the canary update queue 820 is one, the processor 110 may perform a canary update of a task corresponding to the canary update-to-be-performed information.

In some embodiments, if the number of pieces of canary update-to-be-performed information stored in the canary update queue 820 is two or more, the processor 110 may perform a canary update in an order of being stored in the canary update queue 820.

In some embodiments, if a task stored late in the canary update queue 820 has a higher priority than an early stored task, a canary update of the task having the higher priority may be first performed.

In some embodiments, the canary update module 810 may count the number of canary updates performed for tasks processed by the processor 110. Although not shown in FIG. 8, the canary update module 810 may include information related to the number of performed canary updates and information related to a canary update count reference value. When the number of performed canary updates is the canary update count reference value or more, the processor 110 may update the canary array 510. The canary update count reference value may be a value defined in advance when the system 10 is manufactured.

Figure 9:
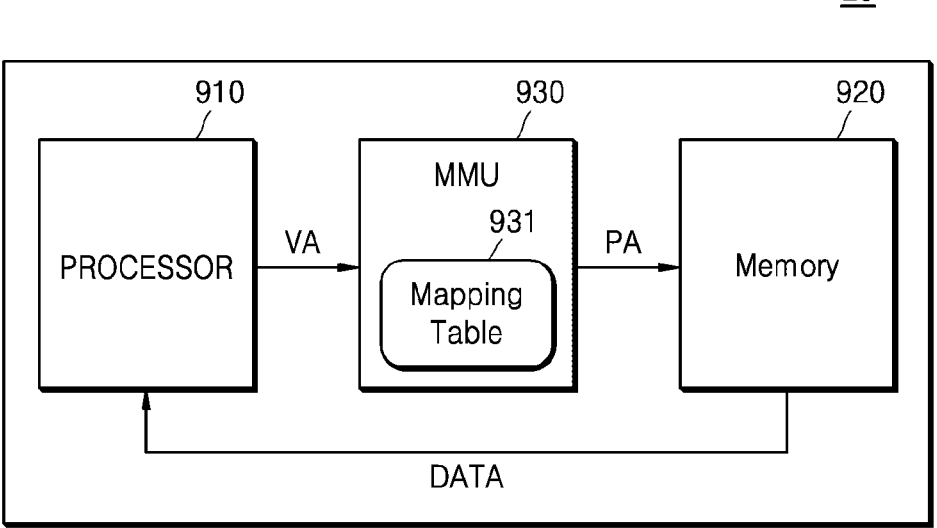
FIG. 9 is a block diagram illustrating a system according to some embodiments.

FIG. 9 is a block diagram illustrating a system 20 according to some embodiments. Particularly, FIG. 9 is a block diagram illustrating the system 20 including an MMU 930. FIG. 9 is described with reference to FIG. 1. A description made with reference to FIG. 1 may not be repeated herein.

The MMU 930 may be referred to as a mapping circuit. Although FIG. 9 shows only the MMU 930, this is only illustrative, and instead of the MMU 930, a memory protection unit (MPU) may be used as the mapping circuit. Although FIG. 9 shows that the MMU 930 is outside a processor 910, the MMU 930 may be included in the processor 910.

The system 20 may correspond to the system 10 of FIG. 1. The system 20 may include the processor 910 and a memory 920 and further include the MMU 930.

The processor 910 may correspond to the processor 110 of FIG. 1. When the processor 910 accesses the memory 920, the processor 910 may access the memory 920 via the MMU 930. The processor 910 may transmit a virtual address (VA) to the MMU 930.

The memory 920 may correspond to the memory 120 of FIG. 1. The memory 920 may receive a physical address (PA) from the MMU 930. The memory 920 may transmit, to the processor 910, data DATA corresponding to the PA received from the MMU 930.

The MMU 930 may include a mapping table 931. When the processor 910 performs a job of processing a task, the processor 910 may transmit a VA to the MMU 930. The MMU 930 may access the memory 920 by converting a VA into a PA with reference to the mapping table 931. Therefore, the MMU 930 may be used to prevent memory intrusion between tasks and prevent buffer overflow. The mapping table 931 is described below with reference to FIG. 10.

The MMU 930 may control a mode in which the processor 910 accesses the memory 920, when the processor 910 accesses the memory 920. For example, when the processor 910 is supposed to process task A, the MMU 930 may operate in a read/write mode to access a memory region needed to process the task A. The read/write mode may be referred to as a first mode. The MMU 930 may operate in a read-only mode to access a memory region except for the memory region needed to process the task A. The read-only/mode may be referred to as a second mode.

In some embodiments, a canary array may also be managed by the MMU 930 by virtualizing a memory address of the canary array. Therefore, when the processor 910 refers to the canary array to update a canary value of a task, a memory region, in which the canary array is located, may be set to the first mode to perform a read/write operation. When the canary array is not referred to, the memory region, in which the canary array is located, may be set to the second mode so that a write operation on the canary array is limited. Therefore, an address may be virtualized and managed by the MMU 930 to prevent in advance a situation that the canary array is exposed to the outside or modified by an unintended operation. In some embodiments, it is assumed that the processor 910 is processing the task A. In this case, if the processor 910 transmits a memory access request related to the task A to the MMU 930, the MMU 930 may operate in the first mode to access a memory region related to the task A. Therefore, both read and write operations on the memory region related to the task A may be possible. Otherwise, if the processor 910 transmits a request not related to the task A to the MMU 930 due to buffer overflow or the like, the MMU 930 may operate in the second mode to access the memory region not related to the task A. That is, even if buffer overflow occurs, a write operation on the memory region not related to the task A may not be permitted, and accordingly, system damage due to buffer overflow may be prevented.

FIG. 10 illustrates the mapping table 931 according to some embodiments. Particularly, FIG. 10 illustrates the mapping table 931 included in the MMU 930 of FIG. 9. FIG. 10 is described with reference to FIG. 9.

The processor 910 may access the memory 920 to process a task. In this case, the processor 910 may transmit a VA to the MMU 930, and the MMU 930 may access a region indicated by a PA of the memory 920 corresponding to the VA, based on information included in the mapping table 931.

Referring to FIG. 10, the mapping table 931 may include information in which a VA corresponds to a PA for each task. In some embodiments, a VA VA_A of a task A stack for processing task A may correspond to a PA PA_A of the task A stack in the memory 920. Likewise, a VA VA_B of a task B stack may correspond to a PA PA_B of the task B stack in the memory 920. A VA VA_C of a task C stack may correspond to a PA PA_C of the task C stack in the memory 920. A VA VA_Z of a task Z stack may correspond to a PA PA_Z of the task Z stack in the memory 920.

Figure 11:
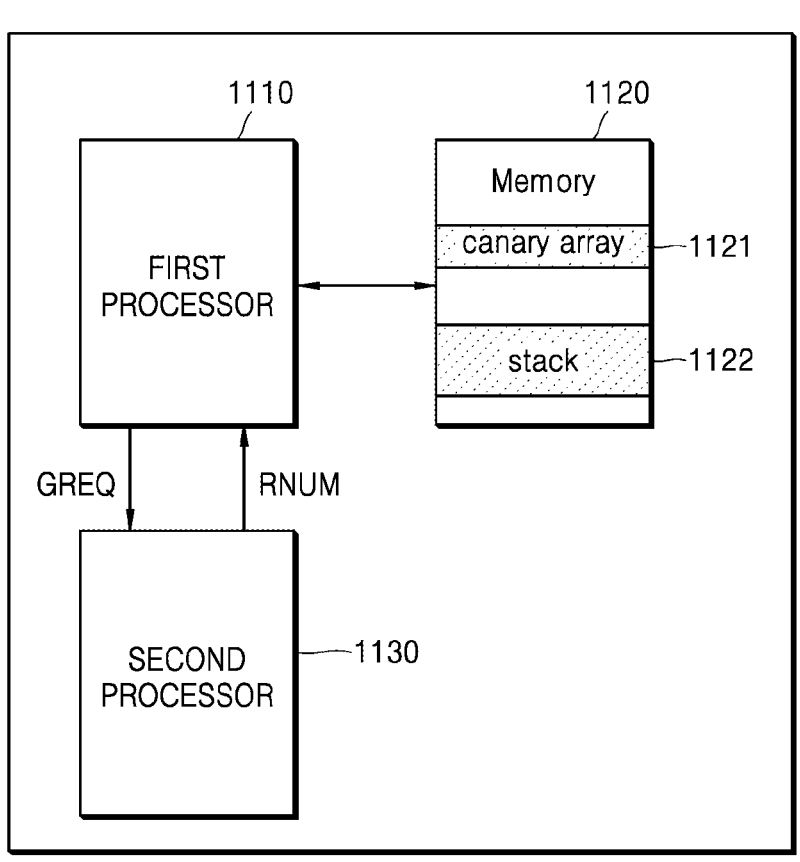
FIG. 11 is a block diagram illustrating a system according to some embodiments.

FIG. 11 is a block diagram illustrating a system 30 according to some embodiments. As shown in FIG. 11, the system 30 may include a first processor 1110, the second processor 1130, and a memory 1120. FIG. 11 is described with reference to FIGS. 1 and 5. A description made with reference to FIGS. 1 and 5 may not be repeated herein.

The memory 1120 may include a canary array 1121 and a task stack 1122. The memory 1120 may correspond to the memory 120 of FIG. 1. The canary array 1121 may correspond to the canary array 510 of FIG. 5.

The first processor 1110 may correspond to the processor 110 of FIG. 1. The first processor 1110 may transmit, to the second processor 1130, a canary generation signal GREQ for requesting a plurality of values. In some embodiments, the canary generation signal GREQ may be transmitted when the system 30 boots. In some embodiments, the canary generation signal GREQ may also be transmitted when the system 30 updates the canary array 1121.

The first processor 1110 may receive, from the second processor 1130, a plurality of canary values RNUM generated by the second processor 1130. The first processor 1110 may initialize the canary array 1121 based on the plurality of canary values RNUM.

The second processor 1130 may communicate with the first processor 1110. The second processor 1130 may receive the canary generation signal GREQ from the first processor 1110. The second processor 1130 may generate the plurality of canary values RNUM in response to the canary generation signal GREQ from the first processor 1110. The plurality of canary values RNUM may be different from each other. The second processor 1130 may transmit the plurality of canary values RNUM to the first processor 1110.

In some embodiments, the second processor 1130 may be hardware capable of independently executing instructions and referred to as an AP, a CP, a BP, a baseband modem, a CPU, a processor core, a core, or the like.

Figure 12:
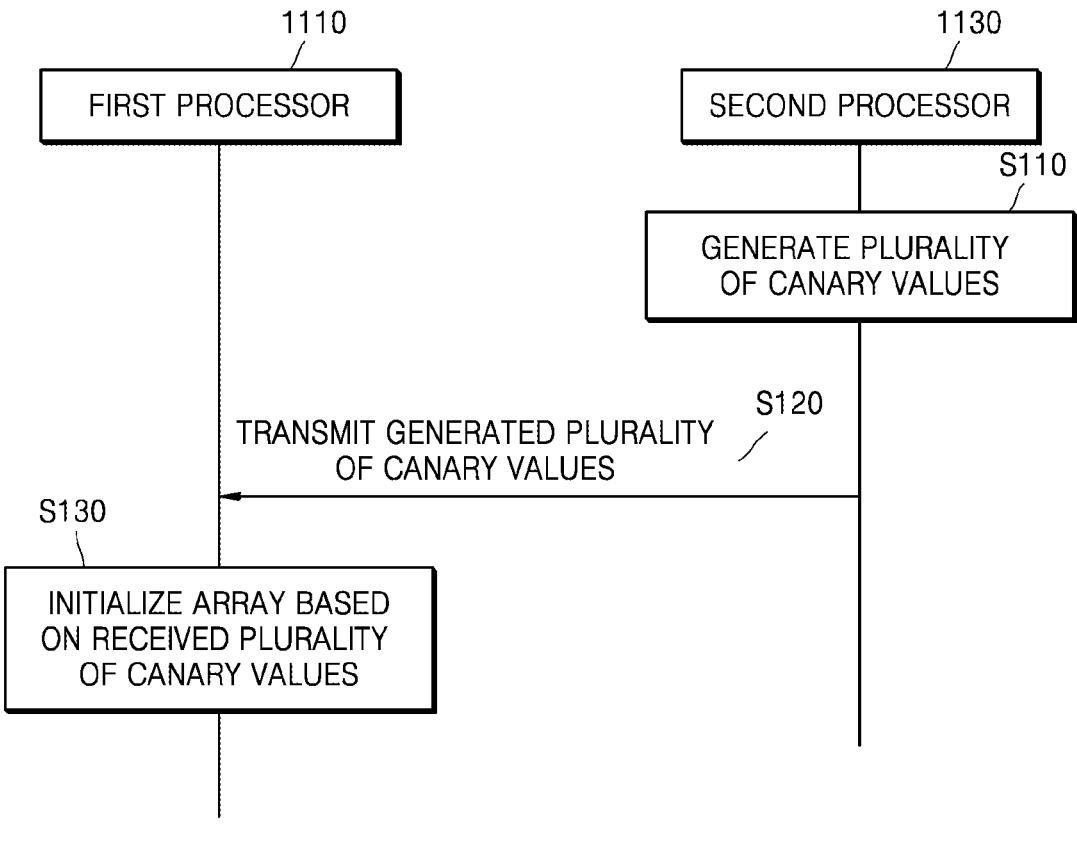
FIG. 12 is a sequential signaling diagram illustrating a canary update method according to some embodiments.

FIG. 12 is a sequential signaling diagram illustrating a canary update method according to some embodiments. Particularly, FIG. 12 is a sequential signaling diagram illustrating a method, performed by the first processor 1110 of FIG. 11, of initializing the canary array 1121. FIG. 12 is described with reference to FIGS. 4, 5, and 11. A description made with reference to FIGS. 4, 5, and 11 may not be repeated herein.

In operation S110, the second processor 1130 may generate a plurality of canary values. In some embodiments, when the system 30 boots, the second processor 1130 may generate the plurality of canary values. The generated plurality of canary values may be different from each other.

In some embodiments, the canary array 1121 may be initialized when a canary update of a task is performed an update reference number of times or more. The update reference number of times may be defined by a user.

In operation S120, the second processor 1130 may transmit the generated plurality of canary values to the first processor 1110.

In operation S130, the first processor 1110 may initialize the canary array 1121 in the memory 1120 based on the plurality of canary values received from the second processor 1130.

Figure 13:
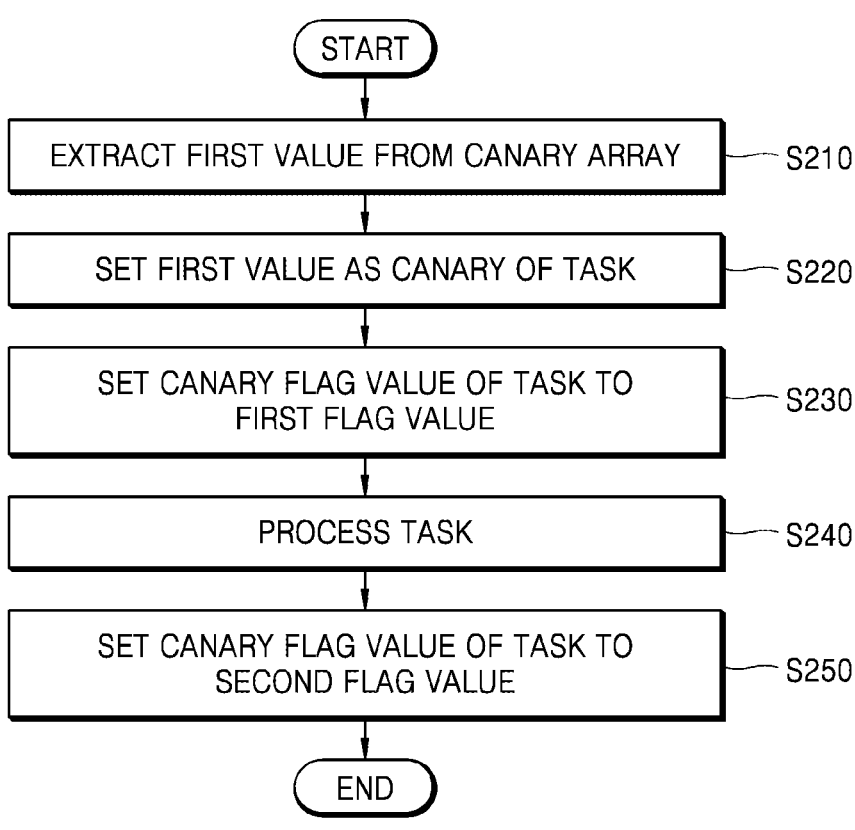
FIG. 13 is a flowchart illustrating a canary update method according to some embodiments.

FIG. 13 is a flowchart illustrating a canary update method according to some embodiments. Particularly, FIG. 13 is a flowchart illustrating operation S200 of FIG. 4. FIG. 13 is described with reference to FIGS. 1 and 4. A description made with reference to FIGS. 1 and 4 may not be repeated herein.

In operation S210, the processor 110 may extract a first value from the canary array 121. The first value may be a value corresponding to a random element selected from among a plurality of elements in the canary array 121.

In operation S220, the processor 110 may set the first value as a canary value of a task.

In operation S230, the processor 110 may transmit a flag update signal to a canary update module so that a canary flag value of the task is the first flag value, before starting to process the task.

In operation S240, the processor 110 may perform an operation of processing the task.

In operation S250, the processor 110 may transmit a flag update signal to the canary update module so that the canary flag value of the task is the second flag value, before ending the processing of the task.

Figure 14:
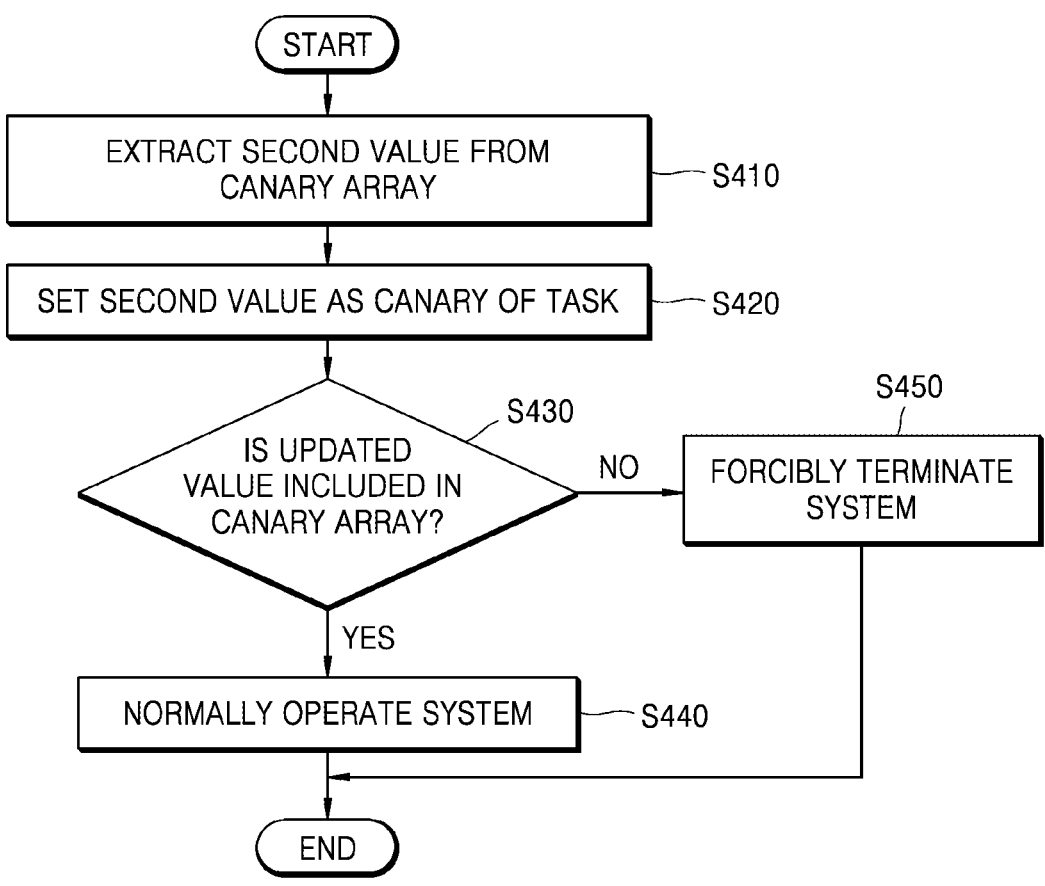
FIG. 14 is a flowchart illustrating a canary update method according to some embodiments.

FIG. 14 is a flowchart illustrating a canary update method according to some embodiments. Particularly, FIG. 14 is a flowchart illustrating operation S400 of FIG. 4. FIG. 14 is described with reference to FIGS. 1, 4, and 13. A description made with reference to FIGS. 1, 4, and 13 may not be repeated herein.

In operation S410, the processor 110 may extract a second value from the canary array 121. The second value may be a value corresponding to a random element selected from among a plurality of elements in the canary array 121. The second value may be different from the first value extracted in operation S210 of FIG. 13.

In operation S420, the processor 110 may set the second value as a canary value of a task.

In operation S430, the processor 110 may verify the canary value of the task. That is, the processor 110 may update the canary value of the task to the second value and then compare the canary value of the task to each element in the canary array 121. In some embodiments, the processor 110 may perform a job of verifying the canary value of the task, by calling a function for the verification. For example, the called function may be embedded in the system 10 and referred to as a stack check fail function.

If the canary value of the task has the same value as an element included in the canary array 121 in operation S430, in operation S440, the processor 110 may determine that a normal canary value is set, and continuously perform an operation demanded from the system 10. In some embodiments, to continuously perform the operation demanded from the system 10, the processor 110 may return to a main task by using a return address of the task.

If the canary value of the task has a different value from any element included in the canary array 121 in operation S430, in operation S450, the processor 110 may determine that the canary value is false, and forcibly terminate the system 10. In some embodiments, when the system 10 is attacked by a hacker, a canary value of a task may not be included in the canary array 121. In some embodiments, when a canary update fails, a canary value of a task may not be included in the canary array 121.

Figure 15:
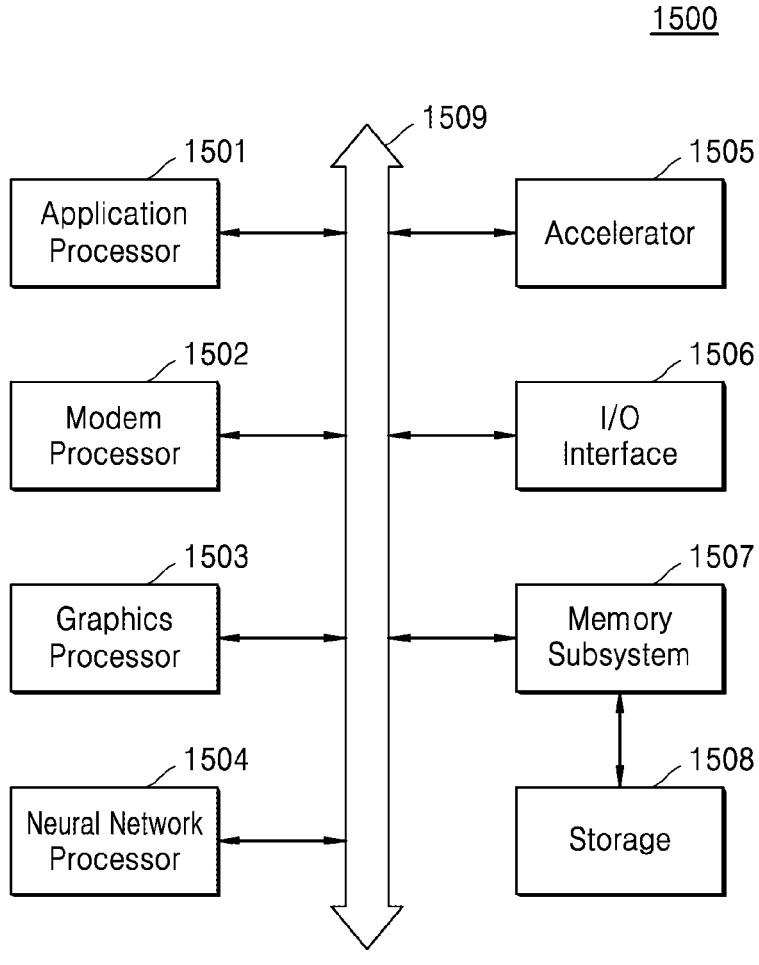
FIG. 15 is a block diagram illustrating a system according to some embodiments.

FIG. 15 is a block diagram illustrating a system 1500 according to some embodiments.

As shown in FIG. 15, the system 1500 may include an application processor (AP) 1501, a modem processor 1502, a graphics processor 1503, a neural network processor 1504, an accelerator 1505, an input/output (I/O) interface 1506, a memory subsystem 1507, a storage 1508, and a bus 1509. The AP 1501, the modem processor 1502, the graphics processor 1503, the neural network processor 1504, the accelerator 1505, the I/O interface 1506, the memory subsystem 1507, and the storage 1508 may communicate with each other via the bus 1509. In some embodiments, the system 1500 may be an SoC in which components are implemented in one chip or in a plurality of chips, and the storage 1508 may be outside the SoC. In some embodiments, at least one of the components shown in FIG. 15 may be omitted from the system 1500.

The AP 1501 may control an operation of the system 1500 at the top layer and control the other components in the system 1500. The modem processor 1502 may demodulate and/or decode a signal received from the outside of the system 1500 and modulate and/or encode a signal generated in the inside of the system 1500. The graphics processor 1503 may execute instructions related to graphics processing and provide, to the memory subsystem 1507, data generated by processing data received from the memory subsystem 1507. The neural network processor 1504 may be designed to process operations based on an artificial neural network at a high speed, and enable functions based on artificial intelligence (AI).

In some embodiments, at least one of the AP 1501, the modem processor 1502, the graphics processor 1503, and the neural network processor 1504 may include two or more processing cores. As described above with reference to the drawings, a processor may process various kinds of tasks required for an operation of the system 1500, and the processor may set and update canary values of the tasks. As a result, the security of the system 1500 may be reinforced.

The accelerator 1505 may be designed to perform a designated function at a high speed. For example, the accelerator 1505 may provide, to the memory subsystem 1507, data generated by processing data received from the memory subsystem 1507. The I/O interface 1506 may provide an interface configured to receive an input from the outside of the system 1500 and provide an output to the outside of the system 1500. The memory subsystem 1507 may be accessed by the other components connected via the bus 1509. In some embodiments, the memory subsystem 1507 may include a volatile memory, such as DRAM or SRAM, or a nonvolatile memory, such as resistive random access memory (RRAM). In addition, in some embodiments, the memory subsystem 1507 may provide an interface for the storage 1508. The storage 1508 may be a storage medium, which does not lose data even when power is cut off. For example, the storage 1508 may include a semiconductor memory device, such as a nonvolatile memory, or a random storage medium, such as a magnetic card/disk or an optical card/disc.

While the inventive concept has been particularly shown and described with reference to embodiments thereof, it will be understood that various changes in form and details may be made therein without departing from the spirit and scope of the following claims.

What is claimed is:

1. A method of updating a canary included in a task to be processed by a processor, the method comprising:

executing, by the processor configured to process tasks including the canary, computer program instructions to perform operations comprising:

extracting a first value from an array including N values and setting the canary to the first value, wherein N is an integer greater than or equal to 1;

determining, based on a canary flag value of a first task, that the canary is to be updated; and extracting, after determining that the canary is to be updated, a second value from the array and updating the canary of the first task to the second value, wherein the processor is configured to access a memory through a mapping circuit, and wherein the mapping circuit includes mapping information between a physical memory region in the memory corresponding to the first task and a virtual memory region associated with the mapping circuit.

2. The method of claim 1, further comprising:

initializing the array when a system boots, wherein the system comprises the processor.

3. The method of claim 1, wherein the setting the canary to the first value comprises:

setting the canary flag value to a first flag value when starting an operation on the first task; and setting the canary flag value to a second flag value when ending the operation on the first task.

4. The method of claim 3, wherein the determining that the canary is to be updated comprises:

determining, when the canary flag value is set to the second flag value, that the canary is to be updated.

5. The method of claim 1, wherein the array includes a plurality of values different from each other.

6. The method of claim 1, wherein the first value is different from the second value.

7. The method of claim 1, wherein the updating the canary to the second value is performed when the processor is in an idle state.

8. The method of claim 1, wherein the updating the canary to the second value comprises:

setting the second value as the canary of the first task;

comparing the canary of the first task to a plurality of values included in the array; and terminating an operation of a system if the canary of the first task is different from all of the plurality of values included in the array.

9. The method of claim 1, further comprising:

extracting, by the processor, a third value from the array and setting the third value as a canary to be used for a second task, wherein the third value is different from the first value.

10. The method of claim 4, further comprising, after determining that the canary of the first task is to be updated, storing canary update-to-be-performed information of the first task in a canary update queue.

11. The method of claim 1, further comprising, when the processor is performing an operation on the first task, setting, to a first mode, a first memory region of the virtual memory region allocated to the first task and setting a second memory region of the virtual memory region to a second mode.

12. A system comprising:

a first processor configured to process tasks;

a memory comprising an array including a plurality of values, and regions allocated to the tasks to be processed by the first processor; and a mapping circuit configured to map a physical memory region among the regions allocated to the tasks to a virtual memory region, wherein the first processor is further configured to perform operations comprising:

extracting a first value from the array, setting a canary of a first task to the first value, determining, based on a change in a canary flag value of the first task, that the canary of the first task is to be updated, and after determining that the canary is to be updated, extracting a second value from the array and updating the canary of the first task to the second value.

13. The system of claim 12, further comprising:

a second processor, wherein the second processor is configured to generate N different values when the system boots, wherein N is an integer greater than or equal to 1, and wherein the first processor is further configured to initialize the array based on the N different values.

14. The system of claim 13, wherein the second processor is further configured to generate the N different values when a number of updates of the canary is a reference value or greater, and wherein the first processor is further configured to initialize the array based on the N different values when the number of updates of the canary is the reference value or greater.

15. The system of claim 12, wherein the array includes a plurality of values different from each other, and the first value is different from the second value.

16. The system of claim 12, wherein the mapping circuit is further configured to, when the first processor is performing an operation on the first task, setting, to a first mode, a first memory region of the virtual memory region allocated to the first task and setting a second memory region of the virtual memory region to a second mode.

17. A non-transitory computer-readable storage medium storing instructions that, when executed by a processor, cause the processor to perform operations comprising:

extracting a first value from an array including N values and setting a canary to the first value, wherein N is an integer greater than or equal to 1;

determining, based on a canary flag value of a task, that the canary is to be updated; and extracting, after determining that the canary is to be updated, a second value from the array and updating the canary of the task to the second value, wherein the processor is configured to access a memory through a mapping circuit, and wherein the mapping circuit includes mapping information between a physical memory region in the memory corresponding to the task and a virtual memory region associated with the mapping circuit.

18. The non-transitory computer-readable storage medium of claim 17, wherein the setting the canary to the first value comprises:

setting the canary flag value to a first flag value when starting an operation on the task; and setting the canary flag value to a second flag value when ending the operation on the task.

19. The non-transitory computer-readable storage medium of claim 18, wherein the determining that the canary is to be updated comprises:

determining, when the canary flag value is set to the second flag value, that the canary is to be updated.

20. The non-transitory computer-readable storage medium of claim 17, wherein the updating the canary to the second value comprises:

setting the second value as the canary of the task;

comparing the canary of the task to a plurality of values included in the array; and terminating an operation of a system if the canary of the task is different from all of the plurality of values included in the array.

* * * * *